Aug. 8, 1967  F. Y. MASSON  3,335,282
EDGE DETECTING SHUTTERS FOR PINHOLE DETECTORS
Filed Jan. 18, 1965  6 Sheets-Sheet 1

FREDERICK Y. MASSON
INVENTOR.

BY
ATTORNEYS

FREDERICK Y. MASSON
INVENTOR.

BY S. A. Giarratana
George B. Oujevolk
ATTORNEYS

FREDERICK Y. MASSON
INVENTOR.

BY
ATTORNEYS

Aug. 8, 1967 F. Y. MASSON 3,335,282
EDGE DETECTING SHUTTERS FOR PINHOLE DETECTORS
Filed Jan. 18, 1965 6 Sheets-Sheet 6

FREDERICK Y. MASSON
INVENTOR.

BY
ATTORNEYS

United States Patent Office 3,335,282
Patented Aug. 8, 1967

3,335,282
EDGE DETECTING SHUTTERS FOR PINHOLE DETECTORS
Frederick Y. Masson, West Orange, N.J., assignor to General Precision Inc., Little Falls, N.J., a corporation of Delaware
Filed Jan. 18, 1965, Ser. No. 426,324
5 Claims. (Cl. 250—202)

This invention is a continuation-in-part of U.S. patent application Ser. No. 356,784, filed Apr. 2, 1964.

This invention relates to optical systems in general and, particularly, to methods and means for eliminating unwanted reflections in such systems. As will become more fully apparent as this description proceeds, the invention is limited in its applicability to optical systems which include a radiation sensitive detection means which responds to radiation of a particular range of wavelengths. Accordingly, by way of example, but not limitation, the invention will be described herein as applied to a particular apparatus embodying such an optical system, viz., a "pinhole detector," the common term of reference for devices which automatically inspect very thin sheets of metal, such as tin plate, or like material, for minute perforations.

It is almost universal practice in optical systems of any sort to minimize unwanted reflections by utilizing flat black finishes on all non-optical surfaces. While these finishes may be achieved by anodization, painting, or other suitable techniques, the object is the same: to absorb incident radiation. In situations where it is necessary to exclude spurious radiation from an optical system, baffles and diaphragms are utilized, and these too are fabricated with flat black surface finishes to prevent reflection.

Unfortunately, flat black surfaces are not 100% efficient in the absorption of incident radiation albeit in most cases, as in cameras, binoculars, and the like, the amount of reflection from a flat black surface may be tolerable.

In certain types of apparatus, however, including the pinhole detector alluded to above, highly-sensitive sensing means are necessarily employed to detect extremely low levels of illumination; in such equipment the small amount of radiation reflected from flat black surfaces is enough to seriously impair the operation of the system. Specifically, it requires that the sensitivity of the detection means be reduced to the point where it no longer responds significantly to the reflected radiation, thus putting a lower limit on the magnitude of the illumination sought to be measured or detected.

In some types of optical apparatus, "collimated" light is utilized and this, in theory, should enable the use of diaphragms, baffles, and the like, and render them effective as means for excluding spurious rays. However, ideal collimation is never achieved in practice and the skew rays inevitably present and reflected from the conventional (flat black) anti-reflection surfaces, are sensed by the detection means.

In pinhole detectors a unique problem exists: for reasons which will become apparent when the apparatus is described in detail, optical pinhole detectors utilize servo-motor operated sliding baffles or "shutters" which closely, but without contact, follow the edges of the sheet material being inspected as it runs through the apparatus. The servo-motor system is under the control of photocells which sense the edge of the sheet material and adjust the shutters accordingly. The photocells are necessarily extremely sensitive and, as precise positioning of the shutters is essential to satisfactory operation of the apparatus, even relatively low levels of reflected illumination are intolerable.

With the foregoing state of the art in view, it is the fundamental object of the present invention to provide means and methods for the improvement of optical systems by the effective elimination of unwanted reflection radiation.

Another object is the provision of novel anti-reflection surfaces and components for optical systems.

A more specific object is to provide, in an optical system having detection means responsive to radiation in a particular range of wavelengths, anti-reflective surfaces which eliminate undesired reflected radiation.

A further object is the provision of improved optical pinhole detectors.

To the fulfillment of these and other objects, the invention contemplates a method of eliminating reflected radiation of a particular range of wavelengths which comprises the step of fabricating at least the surface region of the body reflecting such radiation with a radiation frequency converting material which responds to radiation incident upon such region with emission of a characteristic wavelength outside of said range of wavelengths.

In accordance with another of its aspects, the invention contemplates an optical system including a source of radiation of a particular range of wavelengths, detection means responsive to radiation in that range, and anti-reflecting surfaces in this system formed of material which responds to the radiation with the emission of radiation of wavelengths outside the range of response of the detection means.

Additional objects of the invention, its advantages, scope, and the manner in which it may be practiced will be more fully apparent to persons conversant with the art from the following description of an exemplary embodiment thereof taken in conjunction with the subjoined claims and annexed drawings in which:

Figure 1:
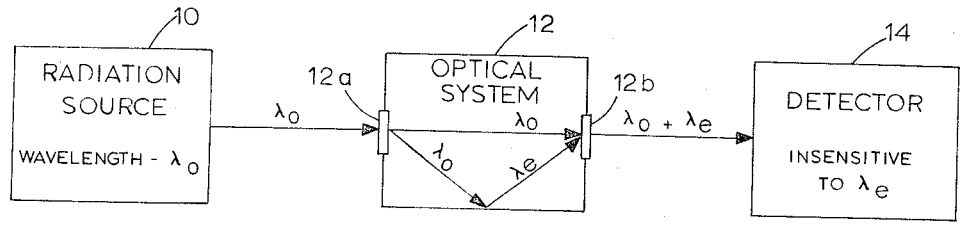
FIG. 1 is a diagrammatic representation of an optical system which will be utilized and referred to in describing the general principles of the invention.

As previously mentioned, the present invention is limited in its specific applications to optical systems which include a radiation-detecting means sensitive to a particular finite range of wavelengths. The detector might be a photomultiplier tube, a solid state photovoltaic cell, a photographic emulsion, or any other element or device which reacts to photo-effective illumination so as to generate a perceptible effect. As symbolically shown in FIG. 1, in the most usual case such an apparatus would include a source 10 of radiation of a particular wavelength region which is sent through an optical system 12 and received by the detection means 14. If desired, the optical system may include means for collimating the light transmitted thereby. Detector 14, of course, is one which responds to radiation within the range of wavelengths emitted by the radiation source. Although not shown in FIG. 1, the optical system may comprise various non-optical elements or structure such as a housing, supports and mountings for lens, prisms, filters or other optical elements, as well as diaphragms, shutters, baffles, etc.

In accordance with the present invention all, or any part, of the non-optical elements or structure which would reflect unwanted radiation to the detection means have at least their surface regions fabricated of a particular radiation absorbent material.

For ease of reference these materials will be referred to as radiation frequency converts for lack of better terminology to encompass generically the two basic categories of materials involved, viz., (1) ordinary luminescent materials and (2) materials which are not luminescent in the strict sense of the word because they emit little or no visible radiation but nevertheless have the ability to absorb radiation over a particular range of wavelengths.

Factors controlling on the selection of particular materials will become apparent as the present description proceeds. In any event, the non-optical structure involved may be fabricated entirely of the selected material or the material may be applied in the form of a paint, surface coating, or laminate.

At this juncture it would be well to establish precisely the nature of the frequency converter material in regard to its suitability for use in conjunction with the present invention. Considering the true phosphors, broadly defined, a luminescent material is one which emits light in response to any stimulus other than high temperature. Thus, for example, steel is not a luminescent material although it emits light (even at room temperature) due to thermal vibrations.

Among the more important of the various specific types of luminescent materials which may be utilized in the practice of the present invention are the following: (1) photoluminescent materials, which emit light as a result of non-luminous incident radiations; (2) fluorescent materials, which contitnue to emit radiation only so long as the stimulus is applied; and (3) phosphorescent materials wherein the emission persists after the excitation is removed.

The critical characteristic of luminescent materials suitable for use in the present invention is that the wavelengths of the emitted radiation fall outside the range to which the detection means responds. It is axiomatic, of course, that in an optical system which includes a correlated source of radiation and a detection means responsive to radiation from said source, that the luminescent material must also be susceptible of stimulation by the source radiation. When luminescense is excited by radiation, the wavelength of the luminescence is usually longer than that of the incident radiation. This is the case when visible luminescence is excited by ultra-violet, X-rays, or gamma rays.

Expressed symbolically, if radiation from a source has a wavlength $\lambda_0$ and is incident upon luminescent material, the incident radiation is absorbed and a luminescent radiation emitted which has a different wavelength $\lambda_e$. Now, if the detection means is responsive to radiation of wavelengths in the range $\lambda_1$ to $\lambda_2$, then by proper selection of the luminescent material, its emission $\lambda_e$ is outside the range of sensitivity of the detector. A filter which transmits $\lambda_0$ but not $\lambda_e$ may be employed to limit detector sensitivity.

Reverting now to the non-luminescent materials, these are exemplified by UV (ultraviolet) absorbers such as American Cyanamid Company's "Cyasorb UV 24" which absorbs wavelengths below 380 millimicrons. In this case, there is very little visible luminescence; the incident radiation is converted primarily to radiation in the infra-red region of the electromagnetic spectrum.

Referring to FIG. 1, it will be seen that radiation from source 10 having wavelength $\lambda_0$ passes into optical system 12, represented by a box having aligned windows 12a and 12b in opposite walls and having its interior surface finished with frequency converter material, luminescent or non-luminescent. The principal beam passes through windows 12a, 12b and on to detector 14. Scattered rays striking the inner surface of radiation $\lambda_e$ to which detector 14 is insensitive. Consequently, even though the beam emerging from the optical system is composed of wavelength regions $\lambda_0$ and $\lambda_e$, the detector responds only to $\lambda_0$.

Figure 2:
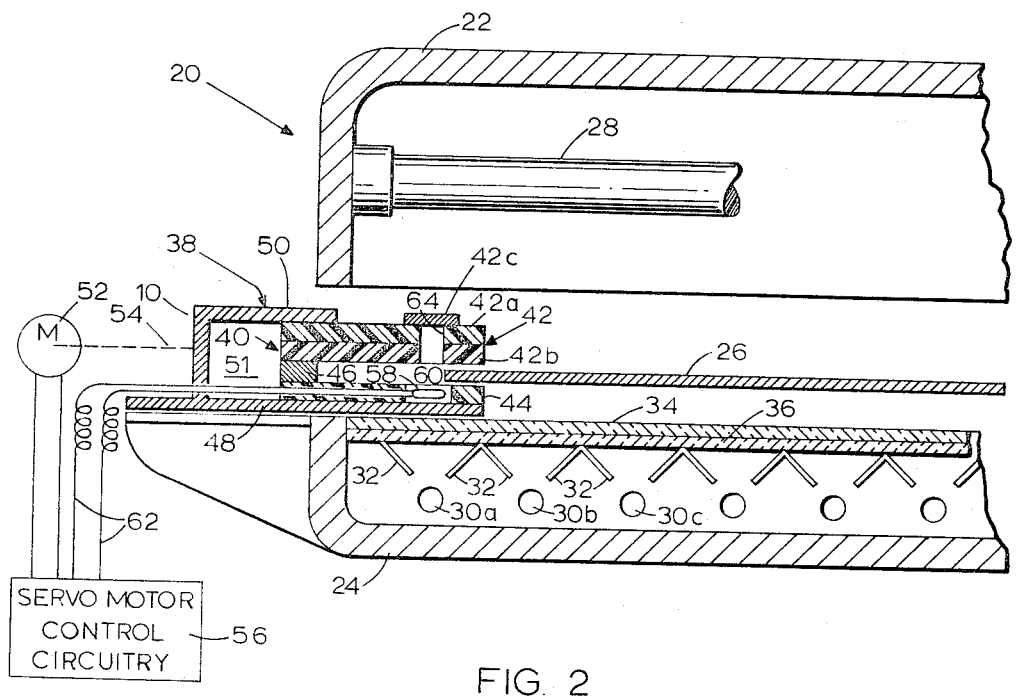
FIG. 2 is a fragmentary sectional view, partially schematic, showing a pinhole detector embodying the present invention.
Figure 3:
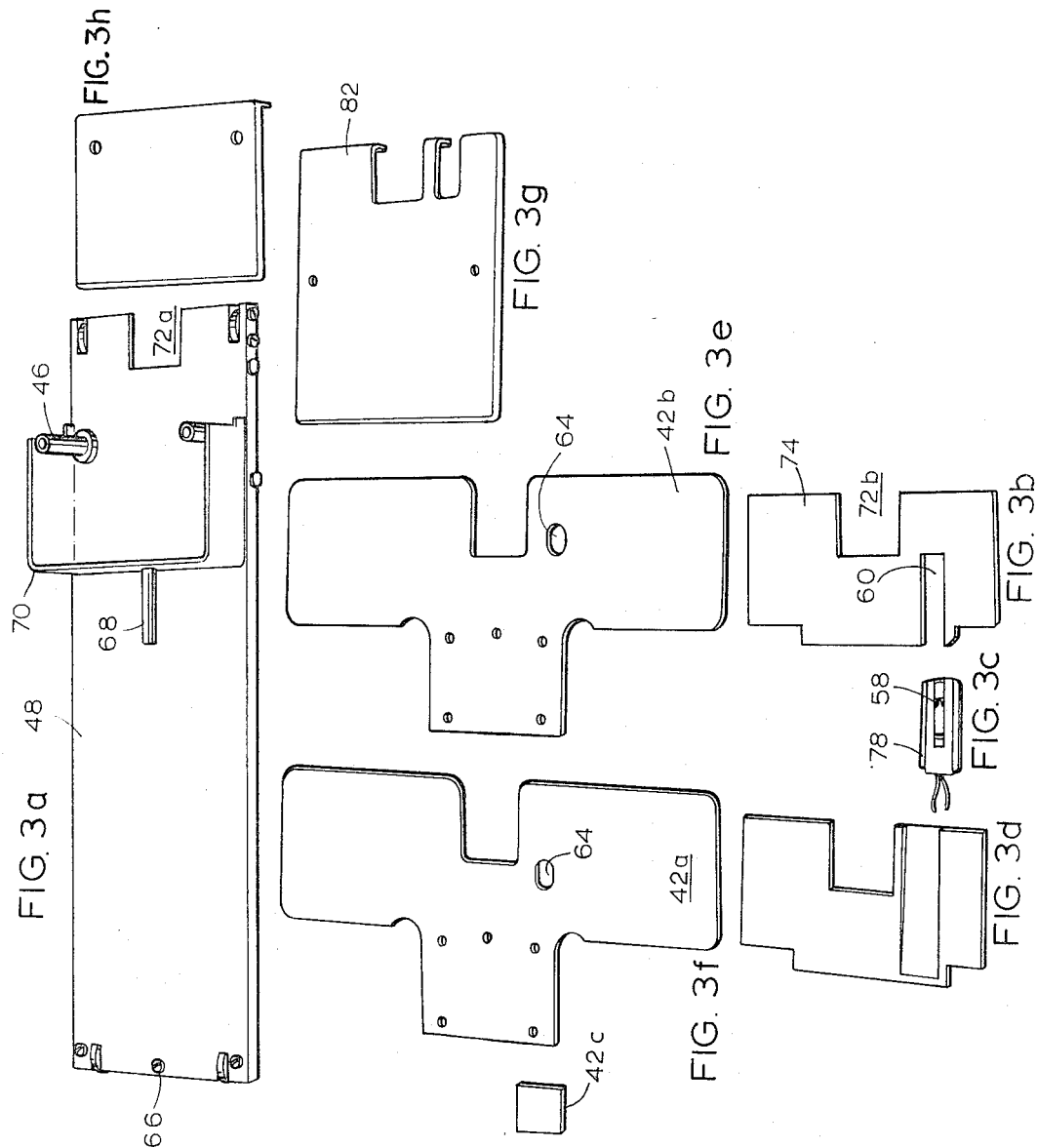
FIGS. 3a to 3h show the individual components used in the shutter assembly of the optical system schematically depicted in FIG. 2.
Figure 4:
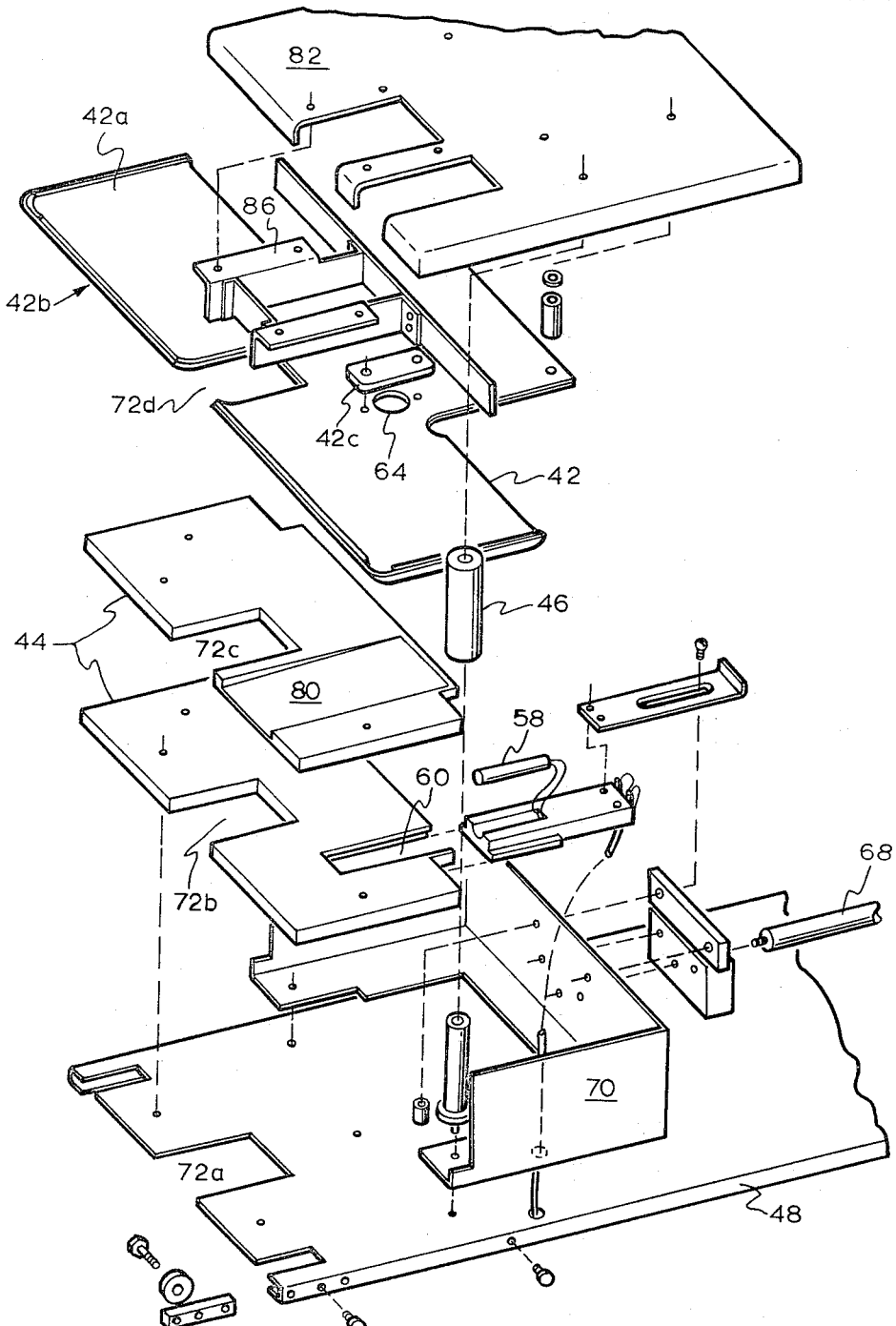
FIG. 4 is an exploded view of the components individually illustrated in FIGS. 3a to 3h when assembled.
Figure 5:
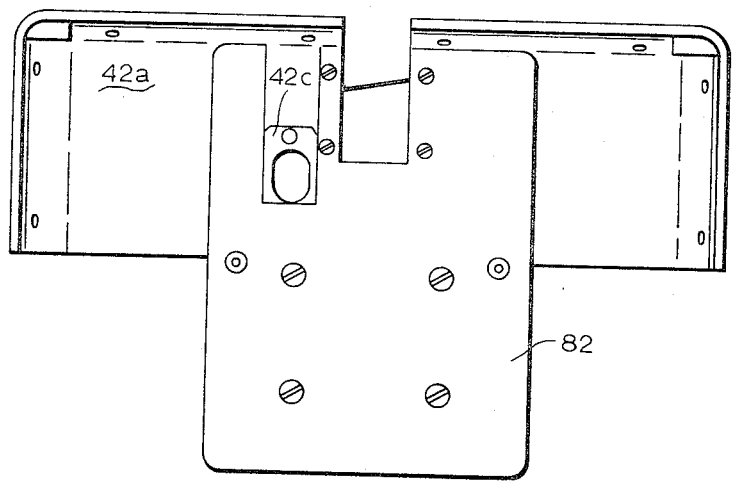
FIG. 5 is a top view of a portion of the shutter assembly shown in FIG. 4.
Figure 6:
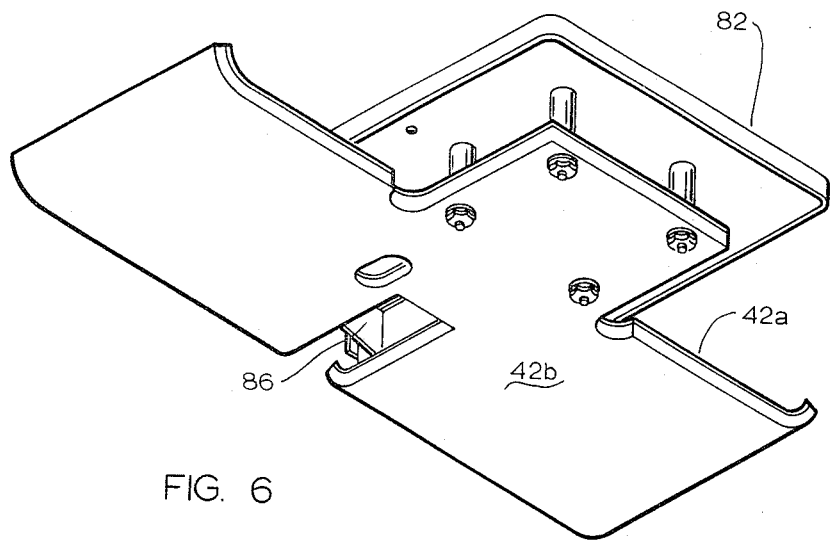
FIG. 6 is a perspective bottom view of the shutter assembly portion shown in FIG. 5.
Figure 7:
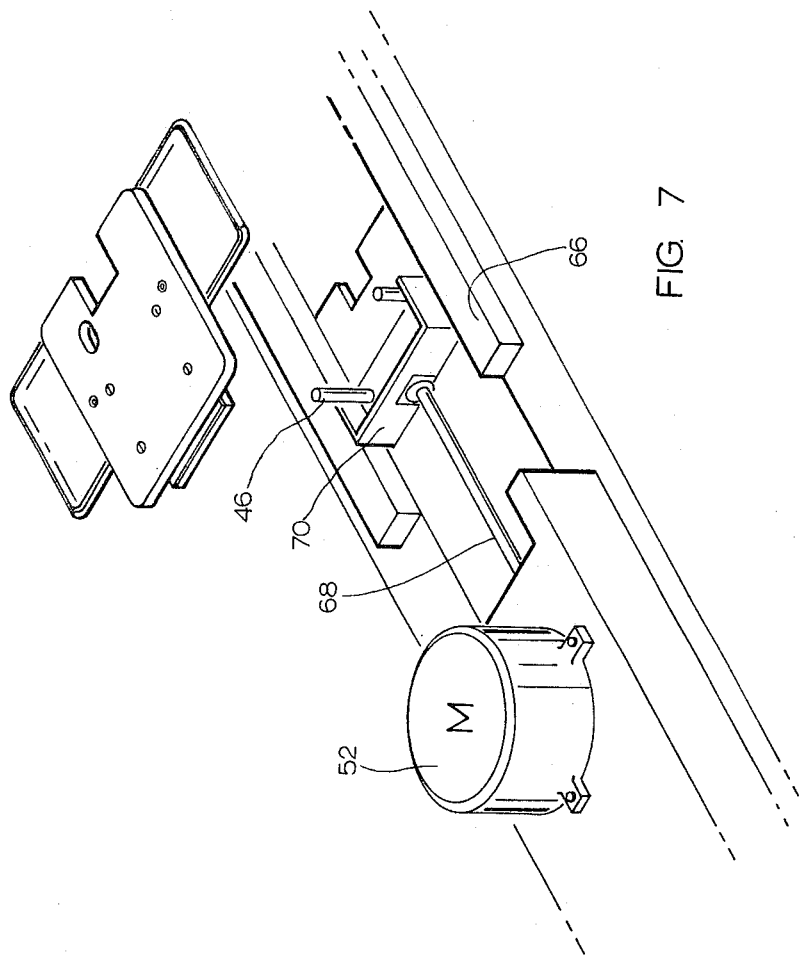
FIG. 7 illustrates the shutter assembly of FIG. 4 in use.
Figure 8:
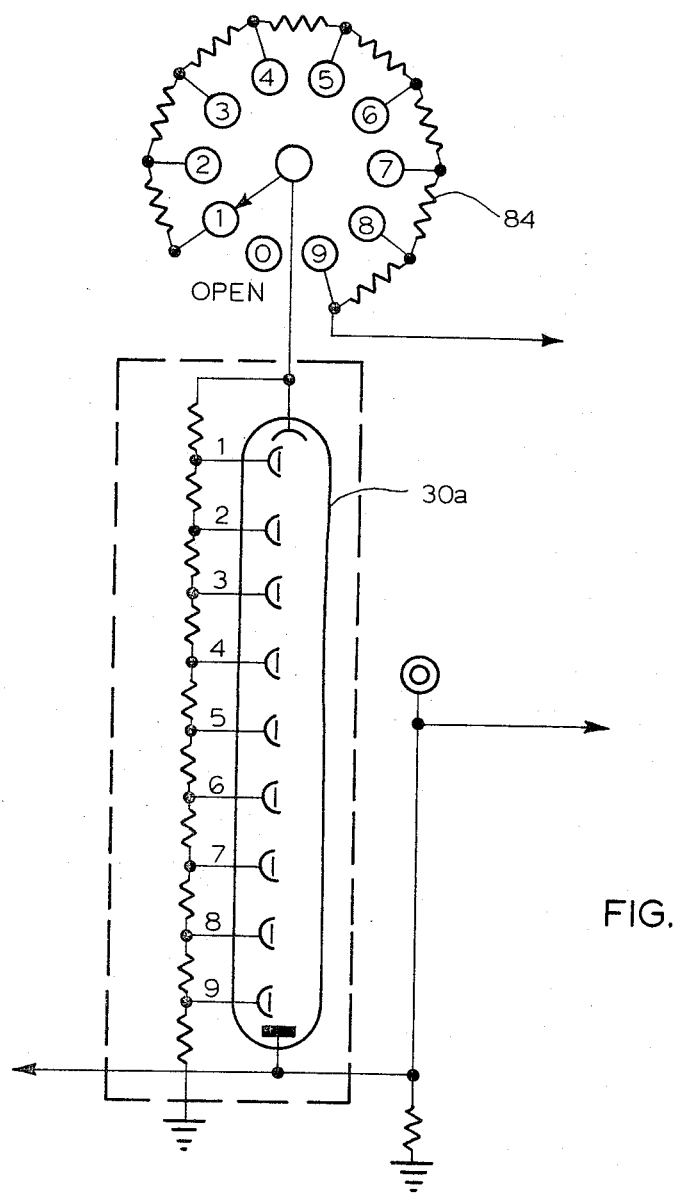
FIG. 8 depicts schematically the adjustment.

One practical application of the principle will now be described as applied to an optical pinhole-detection apparatus 20 a representative fragment of which is shown in FIG. 2.

The basic construction of apparatus 20 is conventional and, therefore, has been shown more or less schematically. It consists of a housing made up of an upper section 22 and a lower section 24 disposed and supported in spaced relation by structure, not shown, to permit indeterminate lengths of sheet material 26 to traverse therebetween. One of the foremost uses of equipment of this type is for the inspection of thin "tin plate" sheet steel for pinholes. The tin plate usually processed is for use in fabrication of "tin cans" and may be from 2 to 20 mils in thickness. Pinholes not larger, and preferably smaller, than one mil in diameter must be detected.

Housing sections 22 and 24 are elongated in a direction transverse to the direction of movement of tin plate 26 (which is perpendicular to the plane of the paper in FIG. 2) and are substantially the same at each end. Upper section 22, of inverted-trough-shaped configuration contains a source of ultraviolet light which, in the illustrated embodiment, is a fluorescent tube 28. Lower housing section 24, also trough-shaped but disposed in an upright attitude, contains a bank of photomultiplier tubes 30a, 30b, 30c . . . arranged in a single row at uniformly spaced intervals. Pairs of reflectors 32, diverging upwardly from each photomultiplier tube, funnel light to the respective tubes.

Overlying the bank of tubes and reflectors, and closing the top of lower housing section 24, is a plate 34 of pyrex glass superposed on a plate 36 of filter glass or the like adapted to transmit only the particular UV wave-length emitted by tube 28, e.g., about 3600 A. From the structure thus far described it will be seen that, as sheet material 26 is drawn through the apparatus, UV light from source 28 will pass through any pinholes in the material and, impinging on the underlying photomultiplier tube, will produce an output signal via conventional circuitry, not shown.

In order to accommodate tin plate stock of different nominal width and to compensate for width variations which are characteristic of rolled strip, a shutter assembly 38 is provided to prevent UV from source 28 passing around the edge of tin plate 26 and causing spurious signals from the detector tubes.

Due to the irregular edge of the tin plate, and to avoid wear and prevent ruffling the edges of thin stock, shutter assemblies are necessarily designed to operate without making physical contact with the edges of sheet 26. To this end, the shutter proper, 40, takes the form of an assemblage of baffle plates which is U-shaped when viewed in section along a plane perpendicular to tin plate 26, the edge of which passes between the legs of the U. Specifically, shutter 40 consists of an upper baffle plate 42 and a lower baffle plate 44 separated by a suitable spacer, such as block 46, between the outer edges of the plates.

Shutter 40 is mounted with its lower plate on a carriage member 48 which, in turn, is mounted for translational movement along a guide or track, not shown, on housing section 24. Shutter assembly 38 also includes a removable cover member 50, which defines a light-trap chamber 51 enclosing the outer end of shutter 40, i.e., the right portion of the U-shape section.

To and fro movement of shutter assembly 38 along its track is effected by a reversible electric motor 52 mechanically coupled to the shutter assembly by any suitable linkage, schematically represented by broken line 54. Motor 52 is under the control of a servo system diagrammatically represented by block 56 which receives feedback signals as to the position of shutter assembly 38 from a photocell 58 disposed in a recess 60 in lower baffle plate 44 of shutter 40. Photocell 58 is electrically connected to the servo circuitry 56 by means of slack, flexible conductors 62.

Substantially aligned with recess 60 in lower baffle plate 44 is an aperture 64 in upper baffle plate 42. UV light from source 28 passes through aperture 64 and normally impinges on photocell 58. However, as will be seen from FIG. 2, light incident upon photocell 58 can be wholly or partially intercepted by the intrusion of the edge of sheet material 26 between baffles 42 and 44 to the point where it is wholly or partially interposed between aperture 64 and photocell 58. In order to maintain a constant, predetermined width of overlap of the edge of sheet 26 by baffle plates 42, 44, established by the position of photocell 58, the servo-control circuitry is adjusted to energize motor 52 so as to move shutter assembly inwardly (toward the sheet material) or outwardly, as necessary to maintain a constant illumination of the photocell. Thus, as the edge of sheet 26 intrudes farther than the preset amount between baffles 42, 44, due to local increase in width or shifting of the sheet, the shutter assembly is withdrawn a comparable amount to compensate. A duplicate but independent shutter assembly and control system (not shown) is provided on the other side of the apparatus to monitor the opposite edge of the sheet material undergoing inspection.

From the described structure and operation of the pinhole detector, it will be seen that reflections of UV light is trapped between the underside of baffle plate 42 and upper surface of baffles plate 44. It is, of course, undesirable to increase the overlap between the edge of sheet 26 and baffle plates 42, 44 in order to provide more margin for error because the width of the overlap represents uninspected material. On the other hand, if the shutter assembly does not closely follow the edge of sheet 26, direct or reflected light from source 28 can impinge on one of the photomultipliers, say 30a or 30b, causing a spurious indication of non-existent pinholes.

In accordance with the present invention as applied to apparatus of this kind, reflections of UV light are prevented by providing frequency-converting materials on the reflecting surfaces, as previously explained. To this end, baffle 42 is a laminated structure comprising a structural layer 42a, a layer 42b of luminescent or non-luminescent frequency converting material which emits visible or invisible radiant energy of wavelengths outside the range of sensitivity of photocell 58, i.e., UV light, and a section 42c similar to 42b, as will be hereinafter described. The UV filter 36, in effect, renders photomultiplier tubes 30a, 30b . . . insensitive to the wavelengths "reflected" by the frequency converting material. Lower baffle plate 44 is likewise constructed entirely, or provided with an upper surface, of frequency converting material.

In the drawing, the components of the shutter assembly 38 are illustrated individually, as well as in exploded view. The carriage member 48 has an elongated rectangular frame and is disposed for movement transverse to the passage of the metal strip beting tested.

Guide means 66 are provided to this end. The carriage member 48 is moved by motor linkage 54 which includes a friction drive rod 68 and a motor M. Towards the forward end of the carriage member are spacers 46 which also mount vertical rollers for shutter protection due to edge slamming. The spacers are surrounded by an enclosing rectangular black wall 70. A rectangular test opening 72a is cut out at the front end of the carriage member 48. Mounted over carriage member 48 is a rectangular edge sensing slide holder 74. This holder has a forward test opening 72b corresponding to carriage member test opening 72a. Alongside the test opening 72b is a recess 60 which will hold photocell 58. Recess 60 extends from the rear of slide holder 74, but there is a slight overlapping of the open areas so that photocell 58 will sense past the innermost side of test opening 72b. The photocell 58 will be lodged in rectangular housing member 78, which can be accommodated in slide holder recess 60. As can be seen from the drawing, light from source 28 will, in the absence of material being tested simultaneously, be sensed partly by photocell 58 within recess 60 and entirely by photomultiplier tube 30a, the light passage through the test opening 72b. When a strip of material is inserted, provided there are no pinholes, light passing through test opening 72b will not be sensed by photomultiplier 30a but will partly be sensed by photocell 58 in recess 60 which in turn is connected to servo circuitry 56. Over the photocell mounting member 74 is lower baffle 44 of UV absorbing material. Lower baffle 44 corresponds in shape generally to the slide holder 74 and has an inclined section 80 which will remove dust and metal powders formed during processing. This inclined section conveys this unwanted material outside the work area. There is also a forward test opening 72c.

Spaced from the lower baffle by spacer 46 is two layer upper baffle 42 consisting of a lower layer 42b of UV absorbing material disposed over the lower baffle, but having an aperture 64 disposed over the photocell 58. Over the lower layer 42b is upper layer 42a of sheet metal colored black, likewise with an aperture 64. Over upper layer 42a and over aperture 64 is a section 42c of UV absorbent material so that light directed to photocell 58 effectively passes through two layers of UV absorbent material, section 42c and lower baffle 44. The reason section 42c is cut out of layer 42b and does not form part of this layer is that metal abrasions from the passing strip tend to damage this layer and reduce radiations on the edge sensing detector. In this way, the section is not damaged. UV absorbing material lower layer 42b is mostly to prevent light from traveling around the edges of the material so that slight damage to other parts of this layer is not too important. Over the entire assembly is a black cover 82 which, together with wall 70, forms a light trap. Upper baffle 42, likewise, has a test opening 72d corresponding to similar openings, 72a, 72b and 72c.

The photomultiplier tubes depicted schematically in FIG. 2 may sometimes cause difficulty in operating the device. If one of these tubes is completely defective, there is, of course, no alternative but to replace it. However, quite often, this is not the case and the replacing of the tube will not solve the problem. As can be seen, there is in fact a bank of tubes, and, although the output from these tubes does not have to be identical, there should be sufficient uniformity in their output to supply proper information to a data logger. As is well known by tube manufacturers, even the supplying of tubes with identical characteristics at the start does not solve the problem, since with the passage of time, there is a drift in the sensitivity of the various tubes which quite often differs from tube to tube so that after a much longer time, some tubes will be almost like new while others will be completely worthless. To adjust the tubes to provide a uniform sensitivity across the detector width, there is, therefore, a voltage divider adjustment 84 for each of the photomultiplier tubes. This adjustment is based on the strongest tube which is biased down to the strength of the weakest. In addition, there is an open position which is extremely useful in checking out individual tubes for noise and high dark current. It is sometimes possible that one pinhole will provide an output signal on two tubes. This can occur through defects in the detector, apparatus other than the tubes. To test for this possibility, as well as to test for other defects, e.g., defects in the data logger used with the detector arrangement, one or more of the photomultipliers can be set on the voltage divider adjustment 84 open position. To further assist in preventing angle light from going around the edge of the material being tested, a collimator 86 is mounted in the test openings.

It is to be observed, therefore, that the present invention provides for an apparatus for the inspection detection of minute perforations in sheet material comprising, a source of radiation in a predetermined range of wavelengths and not transmissable by the sheet material to be inspected; radiation detection means disposed with respect to said source so as to receive radiation therefrom and to define a space traversed by said radiation, for the reception of sheet material to be inspected, such material extending in a plane transverse to the path of said radiation; baffle means in said space adapted to co-act with the edge of the sheet material therein to preclude passage around said edges of radiation from said source to said detection means, at least the surface portion of said baffle means on which radiation is incident being formed of a frequency converting material which absorbs radiation on in said range of wavelengths and converts such radiation to radiant energy in a second band of wavelengths beyond the range or response of said detection means; edge sensing means within said baffle means responsive to radiant energy in said second band of wavelengths; carriage means on which said baffle means are mounted for moving said baffle means across the width of said sheet material; and, a servo loop responsive to said edge sensing means maintaining said carriage means so that said edge sensing means constantly tends to receive a predetermined amount of radiation from said source. The carriage member is mounted for movement along guide means and includes a forward test opening disposed towards the sheet material to be inspected, defining said space traversed by said radiation. The photocell edge sensing means responsive to said second band of wavelengths is mounted on said carriage member and disposed to extend at least to said forward test opening. The baffle means includes lower and upper baffles mounted on said carriage member so spaced vertically from each other as to allow said sheet material to pass therebetween and include a forward test opening corresponding to the similar opening in said carriage member defining said space. The edge sensing means is mounted in a slide holder affixed to the carriage member with a formed test opening corresponding to similar openings in the carriage member and the lower and upper baffles with a recess extending from the rear thereof slightly overlapping the forward test opening. The lower baffle preferably has an inclined section, the inclination being downward away from said sheet material so as to convey away metal filling from the apparatus. The upper baffle has an upper protective piece integral therewith with an aperture therein and in said upper baffle for the passage or radiation to said photocell edge sensing means and an additional baffle over said protective piece aperture.

While there has been described what at present is believed to be the preferred embodiment of this invention, it will be obvious to those skilled in the art that various changes and modifications may be made therein without departing from the invention, and it is aimed, therefore, to cover in the appended claims all such changes and modifications as fall within the true spirit and scope of the invention.

What is claimed is:
1. A light blocking structure for incorporation with inspection apparatus having a radiation source in spaced relation to photoresponsive means for longitudinal movement therebetween of a web to detect minute perforations therein, said structure being so constructed and arranged with respect to a lateral edge of said web as to prevent radiation from passing around said lateral edge and comprising, in combination:
   (a) a first member, opaque to radiation from said source, having a surface disposed toward the plane of said web and a forward edge extending between said lateral edge of the web and said radiation source;
   (b) a second member having a surface disposed toward the plane of said web and rigidly secured to said first member in spaced relation for movement of a lateral edge of said web therebetween;
   (c) means for moving said first and second members in a direction transverse to the direction of movement of said web;
   (d) aperture means in said first member to allow passage of radiation from said source through a predetermined portion thereof;
   (e) edge detecting photosensitive means affixed to said second member in registration with said aperture means, whereby radiation passing through said aperture means and past said lateral edge of the web impinges on at least a portion of said edge detecting photosensitive means;
   (f) filter means adapted to block radiation to which said photoresponsive means is sensitive and to pass radiation to which said edge detecting photosensitive means is sensitive, arranged in covering relation to said aperture means on the opposite side of said first member from the plane of said web, whereby said filter means is not susceptible to contact by said web; and
   (g) a servo loop for actuating said means for moving in response to the amount of radiation passing said lateral edge of the web to impinge on said edge detecting photosensitive means, whereby said light blocking structure is moved to maintain a substantially constant amount of radiation on said edge detecting photosensitive means as the transverse position of said lateral edge changes.

2. The invention according to claim 10 wherein said photoresponsive means comprises an array of photomultiplier tubes arranged across the width of said web, and said edge detecting photosensitive means comprises a photoresistive cell.

3. In inspection apparatus for detecting minute perforations in a moving web by means of radiation passing through said perforations to impinge on photoresponsive means on the opposite side of said web, a movable light blocking device for preventing radiation from passing around a lateral edge of said web to impinge on said photoresponsive means, said device comprising, in combination:
   (a) upper and lower baffle plates arranged in vertically spaced planes for movement therebetween of said lateral edge;
   (b) edge detecting photosensitive means affixed to said lower plate;
   (c) means permitting passage of radiation through at least a portion of said upper plate to impinge upon at least a portion of said edge detecting photosensitive means; and
   (d) window means associated with said lower plate in covering relation to said edge detecting photosensitive means and having a surface disposed generally toward said web, said surface being inclined from the horizontal; whereby any foreign matter deposited thereon will tend to slide down said surface leaving said window means essentially unobstructed.

4. The invention according to claim 3 wherein said upper plate is opaque and includes aperture means for the passage of radiation to said edge detecting photosensitive means.

5. The invention according to claim 4 wherein a filter which passes radiation to which said edge detecting photosensitive means is sensitive and blocks radiation to which said photoresponsive means is sensitive, is affixed in covering relation to said aperture means on the opposite side of said upper plate from the plane of said web.

References Cited

UNITED STATES PATENTS

| Re. 25,671 | 10/1964 | Larew et al. | 250—219 |
|---|---|---|---|
| 3,255,356 | 6/1966 | Brosious et al. | 250—219 |
| 3,263,086 | 7/1966 | Brosious et al. | 250—237 X |

RALPH G. NILSON, *Primary Examiner.*

J. D. WALL, *Assistant Examiner.*